INVENTOR.
GEORGE R. BIRD
and
BY ALAN E. ROSENOFF

Brown and Mikulka
and
Sheldon W. Rothstein
ATTORNEYS

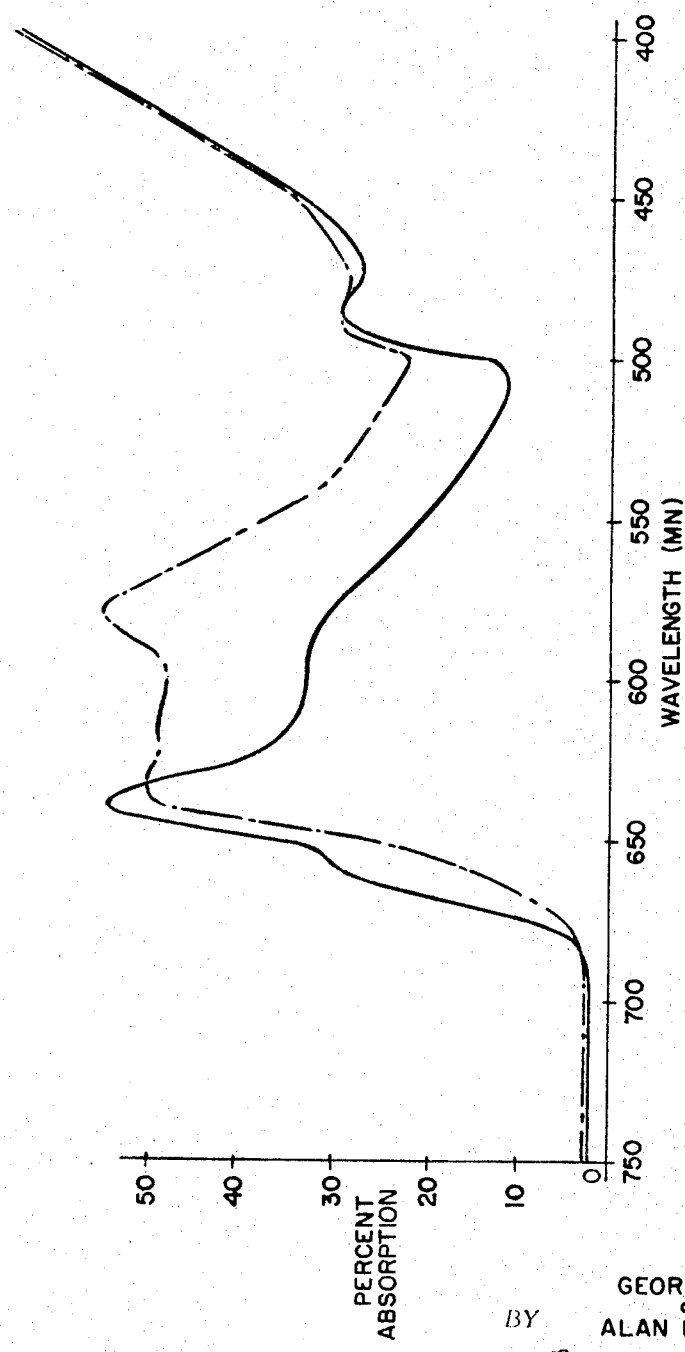

3,730,714
PHOTORESPONSIVE ARTICLES COMPRISING MULTILAYER SPECTRAL SENSITIZATION SYSTEMS
George R. Bird, Princeton, N.J., and Alan E. Rosenoff, Carlisle, Mass., assignors to Polaroid Corporation, Cambridge, Mass.
Continuation-in-part of application Ser. No. 804,254, Mar. 14, 1969, which is a continuation-in-part of application Ser. No. 401,677, Oct. 5, 1964. This application Nov. 4, 1971, Ser. No. 195,779
Int. Cl. G03g 5/08; G03c 1/28
U.S. Cl. 96—1.7                    15 Claims

ABSTRACT OF THE DISCLOSURE

Photoresponse of a given photosensitive medium is enhanced by utilizing a spectral sensitization system which comprises a layer of a cyanine spectral sensitizing dye adsorbed to said photosensitive medium and, superposed thereover, at least one layer of an energy absorbing and transmitting material which possesses a higher intrinsic energy absorption frequency than the energy absorption frequency of the immediately preceding layer, and an intrinsic energy transmitting frequency which overlaps the energy absorption frequency of the next preceding layer, thereby providing a radiationless circuit capable of transmitting photon-excitation-derived energy to said photosensitive medium.

---

The instant application is a continuation-in-part of U.S. application Ser. No. 804,254 of George R. Bird and Alan E. Rosenoff, filed Mar. 14, 1969, now U.S. Pat. No. 3,622,316 which in turn was a continuation-in-part of U.S. application Ser. No. 401,677 of George R. Bird and Alan E. Rosenoff, filed Oct. 5, 1964, now abandoned.

The present invention relates to processes particularly adapted to provide photoresponsive devices possessing greater propensities for absorption of incident energy than had been heretofore possible.

In accordance with techniques disclosed in the art, photoresponsive crystal devices and particularly photoresponsive silver halide crystal devices may be provided with increased electromagnetic radiation absorption and photochemical response by specified sensitization procedures.

Among such procedures is found a technique categorized, and denoted, as chemical sensitization, wherein a photoresponsive crystal, and particularly a photoresponsive silver halide crystal, may be treated with compounds such as various sulfur compounds, for example, those set forth in U.S. Pats. Nos. 1,574,944; 1,623,499 and 2,410,689; salts of noble metals such as ruthenium, rhodium, palladium, iridium and platinum, all of which belong to Group III of the Periodic Table of Elements and have an atomic weight greater than 100, for example, potassium chloroplatinate, sodium chloropalladite, ammonium chlororhodinate, and the like, in amounts below that which produces any substantial fog inhibition, as described in U.S. Pat. No. 2,448,060; gold salts, for example, potassium aurothiocyanate, potassium chloroaurate, auric trichloride, and the like, as described in U.S. Pats. Nos. 2,597,856 and 2,597,915; reducing agents such as stannous salts, for example, stannous chloride, described in U.S. Pat. No. 2,487,850; polyamines such as diethyltriamine, as described in U.S. Pat. No. 2,518,698; and spermine, as described in U.S. Pat. No. 2,521,925; or bis-(aminoethyl)-sulfide and its water-soluble salts, as described in 2,521,926, individually or in combination. Such chemical sensitization procedure provides increased response to electromagnetic radiation by the photoresponsive silver halide crystal treated over the frequency range of the inherent, or natural, response characteristics of the crystal.

A second procedure comprises a technique categorized, and denoted, as a spectral, or optical, sensitization procedure, wherein a photoresponsive crystal, and particularly a photoresponsive silver halide crystal, is provided frequency-selective electromagnetic radiation response characteristics and/or an increase in its inherent, or natural, spectral response characteristics.

In general, such spectral sensitization procedures are accomplished by the adsorption onto surfaces of the crystal of one or more dyes selected from certain classes of dyes including, preferably, cyanine dyes and dyes related to them. For an extensive treatment of cyanine dyes particularly adapted to provide spectral sensitization of a silver halide crystal see Hammer, F. M., The Cyanine Dyes and Related Compounds.

Photographic action may be considered to be the photographic results observed upon transfer of an electron or energy stimulus to a photosensitive material, e.g., or photosensitive silver halide crystal. In practice, it may be measured by an evaluation of the degree of blackening produced in a given photosensitive material by a stimulus, as above denoted, which renders individual silver halide grains developable. The stimulus which alters the characteristics of the photosensitive material to render it developable is transferred to the photosensitive material either directly from incident electromagnetic radiation or from a dye aggregate adsorbed to said photosensitive material. Such photographic action is a function of both the amount of quanta, or stimulus, absorbed, and the relative quantum efficiency of the absorbed quanta in the system. Stated differently, it may be considered to be a function of the stimulus absorptive propensity of a photoresponsive system, and of the efficiency of the system in utilizing the absorbed stimulus to render photosensitive material developable. For purposes of the instant treatment, quantum efficiency is considered to be a measure of the quanta which initiate photochemical changes relative to the total quanta absorbed by a spectrally sensitized photosensitive system. A quantum efficiency less than 1, for example, would indicate that some absorbed quanta were not effective to produce the desired reaction.

By the invention disclosed herein, an increase in the quantum absorptive propensities of a spectrally sensitized photosensitive system has been achieved while experiencing relatively little, if any, deleterious effect on the quantum efficiency of said system.

Accordingly, it is a principal object of the present invention to provide new and improved procedures particularly adapted to provide photoresponsive crystals and, specifically, photoresponsive silver halide crystals, and crystal-employing devices, possessing improved electromagnetic radiation response due to increased incident electromagnetic radiation absorption.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 7 is a graphical comparison of the absorption spectra of a supersensitized silver halide emulsion (solid line) and the same supersensitized emulsion which contains an additional layer of an energy absorbing and transmitting substance (broken line);

Figure 1:
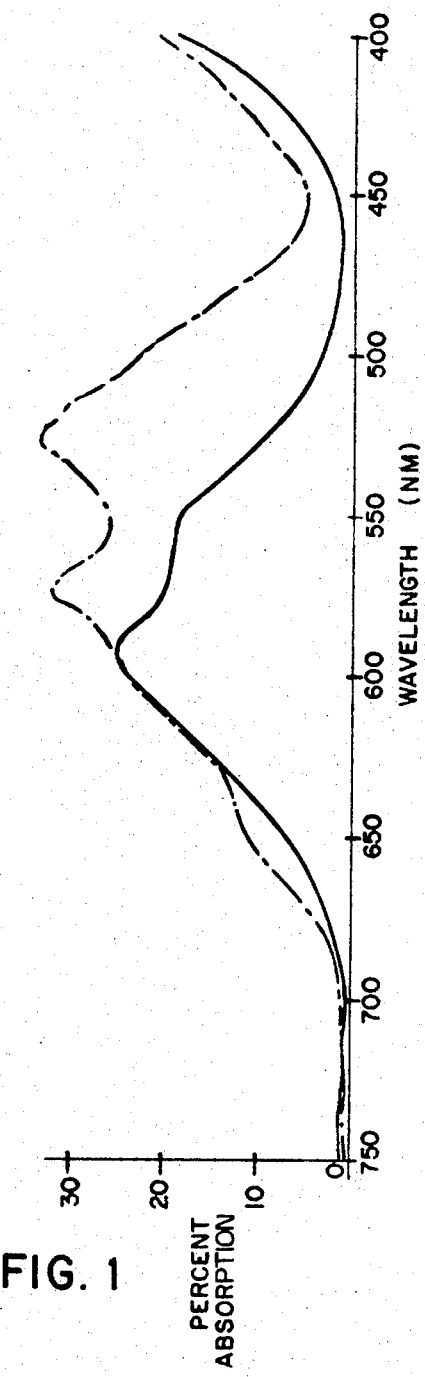
FIG. 1 is a graphical comparison of the absorption spectra of a supersensitized binderless silver halide material (solid line) and the same material which contains an additional layer of an energy absorbing and transmitting substance (broken line)

By means of the traditional procedures disclosed in the art as adapted to accomplish spectral sensitization of a photoresponsive crystal, and preferably sensitization of a photoresponsive silver halide crystal, a cyanine dye in the form of polymeric aggregates is adsorbed to the receptive faces, or surfaces, of the crystal in a statistical monomolecular layer thickness or less. Specifically, the cyanine dyes employed for purposes of photoresponsive crystal spectral sensitization comprise an amidinium ion system in which both of the nitrogen atoms are included within separate heterocyclic ring systems, and in which the conjugated chain joining the nitrogen atoms passes through a portion of each heterocyclic ring. Adsorption is generally believed to be partly accomplished by an unknown type of chemisorption between negative crystal surface charges provided, for example, by the excess halide components of the silver halide crystal, and the positive charge of the cyanine chromophore. Adsorption is also favored by the ability to form silver complexes of nuclei containing an amidinum nitrogen atom of a selected cyanine dye's heterocyclic ring system, or systems, for example, a sulfur, oxygen, or selenium atom, or a second nitrogen atom not directly a component of the amidinium ion system.

It has also been traditionally found that the efficiency of the spectral sensitization of a, for example, silver halide crystal increases in accordance with an increase in the chemisorption of the selected sensitizing dye, in the form of polymeric aggregates, on the appropriate surfaces, or faces, of the crystal up to the concentration at which increase of sensitivity peaks or plateaus. Specifically, maximum sensitization has been found ordinarily to occur at a dye concentration level less than or equal to a statistical monomolecular layer of dye coverage on the adsorbing surfaces of the crystal. As a matter of fact, the concentration of dye at optimum spectral sensitization usually is reached just short of monomolecular coverage of the crystal surface.

Sensitivity conferred by a sensitizing dye does not increase proportionately to the concentration of the dye, but rather passes through a maximum as concentration is increased. Note U.S. Pat. No. 2,688,545. Attempts to increase the spectral sensitivity of the crystal by increasing the concentration of sensitizing dye adsorbed by its appropriate surfaces beyond the plateau or peak concentration level, provide a progressive decrease in spectral sensitivity as the concentration is so increased; see: Hammer, F. M., The Cyanine Dyes and Related Compounds and Borin, A. V., Investigation of the Concentration Effect in Optical Sensitization of Photographic Emulsions, Uspekhi Nauch. Fab. Akad. Nauk. SSSR, Otdel. Ihim. Nauk. 7, 183–190 (1960). In many instances, this resultant decrease in the crystal's spectral sensitivity attans catastrophic proportions when the relative amount of dye necessary to provide a given incremental increase in sensitivity, prior to attainment of the plateau or peak region, is compared with the same amount of dye, in excess of that which provides optimum sensitization. It will be accordingly appreciated that within the context of the above discussion, merely piling layer upon layer of dye upon the crystal will not improve the sensitivity above the plateau region unless the herein-described novel energy transmission circuit is utilized.

The energy or charge-carrier absorptive propensity of a photoresponsive element comprising a plurality of crystals is generally dependent upon the effective, adsorbed presence of sufficient dye to effect maximum absorption of, and transfer of, electromagnetic energy-induced photoreaction stimulus to the crystal. The aforementioned monomolecular layer adsorption of the dye to the appropriate surfaces of the crystals fails, by a relatively large degree, to provide complete adsorption of incident radiation. In fact, in conventional optically sensitized, photographic, photoresponsive elements, such as panchromatic photographic emulsions, coated on a suitable supporting member, comprising a relatively thin layer, for example, in the order of about 7 microns in thickness, and including a dispersion of photoresponsive silver halide crystals in a gelatin matrix, for example, in a concentration of about 100 mgs. of silver per square foot, the photoresponsive element only absorbs roughly in the order of less than ⅓ of the available incident light, over the radiation frequency range desired for photographic employment of the element, with the concomitant failure of such elements to even approximate their potential, or theoretical, efficiency. The maximum absorbed radiation attributable to a given monomolecular dye layer adsorbed on a photosensitive crystal is about 7 percent of the total incident radiation. W. West & V. I. Saunders, Wissenschaftliche Photographie, W. Eichler, H. Frieser and O. Helwich, eds., Verlag Dr. O. Helwich, Darmstadt, 1958, p. 48. Since the above incompletely absorbing system is already sensitized to peak response, the net response of the system cannot be improved by simply adding more of the same sensitizing dye.

The decrease in sensitivity experienced by increasing the number of layers of dye adsorbed on the adsorbing surfaces of the crystal above the concentration level required to provide optimum sensitization is the result of a concomitant plurality of interrelated effects. Among such effects are increased aggregation of dye in aggregates which are unable to transfer charge-carriers or energy to the crystal, and which aggregates compete for adsorption sites on the crystal's adsorbing surfaces with effective sensitizing dye, or dye aggregates, capable of effecting energy transfer. In addition, in extreme situations, such aggregates may positively, and effectively, mask sensitivity itself, or selected sensitivity frequencies, which would ordinarily have been provided by the dye adsorbed in the absence of such aggregates. In addition, the catastrophic results of exceeding, concentrationwise, the plateau or peak region of optimum sensitivity is probably, in part, the result of the formation of a multimolecular layer coverage of dye, on at least a portion of the crystal's adsorbing surfaces, whereby the dye molecule of the multimolecular layer next adjacent the adsorbing surface possesses, by reason of crystal influence, a lower energy absorption wavelength maximum than the energy absorption wavelength maximum of the second and succeeding dye molecules spacially removed from the crystal's surface and contiguous the molecule adsorbed on the crystal surface. Thus, where the energy transmission, or fluorescence emission, bands of the dye molecule adsorbed on the surface of the crystal overlap the absorption bands of the succeeding dye molecules in order of increasing wavelengths of absorption in the direction away from the crystal surface, energy developed by photon excitation irreversibly transfers in the direction away from the photoresponsive crystal, depriving the crystal of the energy necessary for response. This is in accord with the Forester theory of radiationless energy transfer, and with the experimental work of H. Kuhn et al.; see: Theodor Forster, Fluoreszenz Organischer Verbindungen, pp. 83–84; M. M. Zwick u. H. Kuhn, Z. Naturforschung 17a, 411 (1962); and K. H. Dnexhage, M. M. Zeick u. H. Kuhn, Ber. d. Bunsenges. f. physikal. chemie 67, 62 (1963). It will be readily appreciated that even a limited occurrence of sites, on the crystal's absorbing surface, having such detrimental multimolecular layer dye coverage will provide an extremely efficient mechanism for short circuiting the desired pathway of energy transfer toward the crystal. Not only is there then present and occupying active sites on the photoresponsive crystal's adsorbing surface, a dye composite which by structure cannot transfer energy toward the crystal, but, in addition, the dye structure provides a mechanism for conducting energy from the contiguous monomolecular layer situated dye, away from the photoresponsive crystal. Most of the current literature views the loss of blue speed at high dye concentrations as being due to chemical desensitization by the dye—but here a second mechanism which would degrade the sensitized speed and may have some undesirable effect on the blue speed is suggested.

In an attempt to avoid or minimize the foregoing problems, the art has attempted to adopt, in applicable instances, a technique denoted as supersensitization. Specifically, the art employs a technique which comprises adsorbing to a photosensitive crystal surface a monomolecular layer of a plurality of synergistic components, at least one of which comprises a cyanine dye and generally, but not necessarily, all of which comprise a selected plurality of different cyanine dyes in an attempt to provide an increase in photon-derived-excitation energy quantum efficiency. However, the technique merely makes a relatively "good" cyanine dye optical sensitizing agent from a relatively "poor" sensitizer and the combined effective concentrations generally cannot exceed that which provides the previously described monomolecular layer coverage, or less, while still providing maximum sensitization.

It has now been quite unexpectedly discovered that an increased response due to a greater absorption of incident electromagnetic radiation may be provided to a photoresponsive crystal, and particularly to a photoresponsive siliver halide crystal, by a technique which comprises adsorbing a plurality of energy absorbing and transmitting components, in layer relationship, on the receptive surfaces, or faces, of the photoresponsive crystal, wherein the component adsorbed immediately to the crystal surface comprises a layer of an optical sensitizing agent and preferably a cyanine sensitizing dye, present in a concentration which provides maximum sensitization and each succeeding layer comprises a layer of a component having energy transmitting, or fluorescense emission, bands, at least in part, overlapping the energy absorbing bands of the preceding component and situated in order of progressively decreasing wavelengths of absorption, respectively, in the direction away from the crystal surface. Optimal effciency in circuiting photon-excitation-derived energy to the crystal will be achieved when the layers comprising the spectral sensitization system of the present invention are monomolecular since energy losses due to internal effects within discrete layers of different materials will be minimized.

Specifically, in the preferred mode of the present invention a photoresponsive crystal is provided having a multimolecular layer adsorbed to the receptive surfaces, or faces, of the crystal, wherein the multimolecular layer comprises, in order from the crystal surface, about a monomolecular layer of spectral sensitizing agent, which layer preferably comprises a concentration of cyanine spectral sensitizing dye and a supersensitizer therefor, which provides optimum monolayer sensitivity, and at least one monomolecular layer of an energy absorbing and transmitting material, the latter layer(s) also preferably comprising cyanine spectral sensitizing dye, and each of the layers having a photon-excitation-derived energy absorption frequency range at a higher frequency than the energy abosrption frequency range of the next preceding monomolecular layer from the crystal surface and, in the case of all monomolecular layers but the layer contigous the crystal surface, having an energy transmitting, or fluorescence emission, frequency range which overlaps the energy absorption frequency range of the next preceding layer, to provide thereby a circuit capable of transmitting photon-excitation-derived energy to the crystal.

The total frequency range of absorption provided by the composite multimolecular layer will comprise the sum of the absorption frequency ranges of the individual components and may thus be tailored, by suitable component selection, to envelop, or cover, any specific frequency range of electromagnetic radiation desired. It will also be appreciated that each of the components receiving transferred energy will accommodate and respond to incident electromagnetic radiation in addition to the photon-excitation-derived energy transferred to and through the individual component from other constituents of the multilayer structure.

Although the longest wavelength absorber, which is the component directly adsorbed on the receptive faces of the silver halide crystal, must be an optical sensitizing agent and must possess preferential adsorption capacity with respect to the crystal when measured against the adsorption capacity of the remaining components of the multilayer system there is no requirement that any one, or more, of the remaining components themselves be spectral sensitizing agents, although in the preferred embodiment, as aforestated, they will so be constituted, but merely that they possess the capability of transferring photon-excitation-derived energy by means of the circuit described above without imparting any deleterious effects to the photoresponsive system in which they are incorporated. Regarding the adsorptive capacities of the materials contemplated for use herein toward photosensitive silver halide crystals, it is generally appreciated that the most tenaciously adsorptive materials are unblocked selenazoles with thiazoles, oxazoles and imidazoles following in descending order. What this means is that a thiazole will generally replace an adsorbed imidazole, but the converse will not occur.

While it is preferable that the components of the multilayer system pack efficiently against each other and, most preferably, possess a strong attractive affinity by reason of, for example, opposite ionic charges, appropriate hydrogen-bonding groups, and the like, the respective components may, in fact, be separated from each other by insulating components, such as, for example, barium stearate, and the like, where desired for specific application, with resulting decrease in the efficiency of energy, or charge-carrier, transmission, for example, a decrease in efficiency of the energy-transfer mechanism on the order of about 50% is noted when the intermolecular distance between successive components include an effective insulating dimension of about 100 A.; and a decrease in the order of about 98% is noted where the effective insulating dimension is about 200 A. It is sometimes further preferred, for the purpose of facilitating an efficient close packing of the respective components forming the multilayer system, that the cyanine dye, or dyes, other than the component furtherest removed from the crystal surface, possessing linear substituents on the heterocyclic nitrogen atom, or atoms, and especially on those nitrogen atoms forming a component of the amidinium ion system, each possess that substituent, or substituents, which facilitates or, at least, does not actively inhibit formation of a multilayer system having intermolecular dimensions between successive components sufficiently short as to allow efficient transfer of energy between components. For example, lower alkyl groups such as methyl, ethyl and the like are preferred.

The following exemplary material depicts a technique whereby the novel spectral sensitization phenomenon of the present invention may be accomplished.

EXAMPLE I

In order to eliminate any effect that a binder material may have on the response of a spectrally sensitized photosensitive silver halide system of the present invention a binderless silver halide material was fabricated on a polyester support sheet by evaporating onto said sheet pure silver to a coverage of 38 mg. per square foot and then dipping the silver coated sheet into a bromide solution comprising 132.8 gms. of sodium bromide and 5 ml. of elemental bromine in two liters of methanol. The reaction is complete in about 30 seconds yielding silver bromide. The binderless silver bromide sheet is washed in methanol for 10 seconds, then in acetone and air dried. The instant fabrication process is completely described in U.S. application of Russel R. Cook, filed Jan. 7, 1969, Ser. No. 789,588.

In order to evaluate the effect of multilayer multicomponent sensitization of the present invention the binderless silver bromide material was spectrally sensitized with a supersensitizing mixture of a solution containing a red absorbing dye corresponding to the formula:

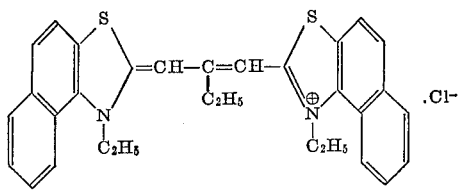

and a blue absorbing supersensitizing dye corresponding to the formula:

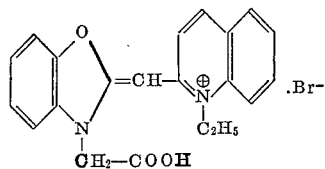

The concentrations of the respective dyes present in the solution are $1 \times 10^{-4}$ and $1 \times 10^{-6}$ molar, respectively. The silver halide-coated sheets are dipped into the dye bath for 5, 15 and 20 seconds, respectively; washed in two successive baths of methanol, in a bath of acetone and air dried.

An absorption spectrum of the 5-second sensitized material was plotted from reflection and transmission data taken on a Cary 14 Spectrophotometer and is reproduced as a solid line in FIG. 1. Reference thereto indicates that the material exhibits a well-defined peak at 592 nm.

Figure 2:
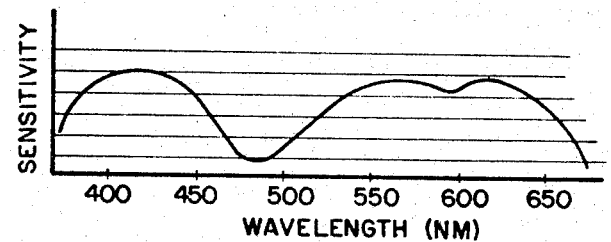
FIGS. 2, 3 and 4 are reproductions of the wedge spectrograms produced by the binderless supersensitized photosensitive material of FIG. 1 at various concentrations of supersensitizing dyes.
Figure 3:
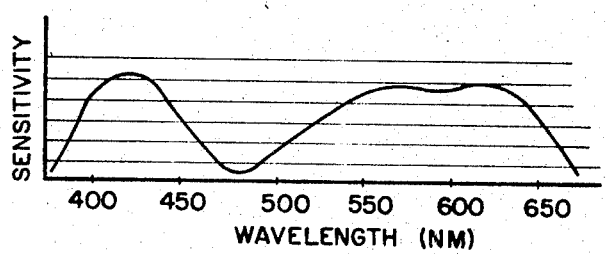
Figure 4:
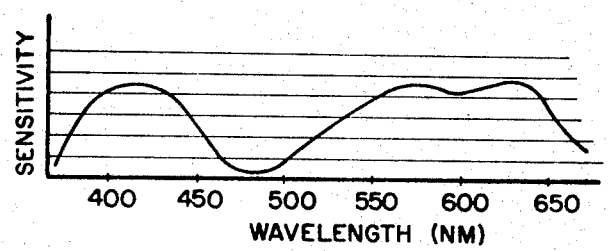

Action spectra of the spectrally sensitized photosensitive material were then run on a Polaroid Wedge Spectrograph. The respective spectra produced on 5-second, 15-second and 20-second imbibed material are reproduced in FIGS. 2, 3 and 4, respectively. A comparison of the three-action spectra indicates that the area of maximum spectral sensitization, or the plateau area, has been reached since red and intrinsic blue speeds are substantially the same. Neither sensitivity increases or dropoffs are evident within experimental tolerances.

Figure 5:
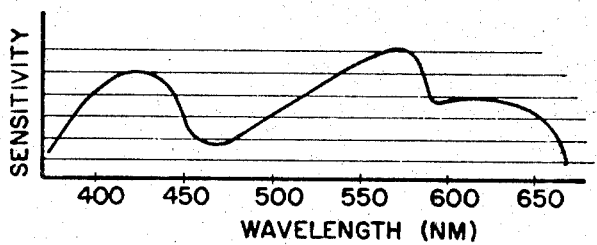
FIG. 5 is a reproduction of the wedge spectrogram of the supersensitized binderless photosensitive material of FIG. 1 which contains the additional layer of an energy absorbing and transmitting substance.
Figure 6:
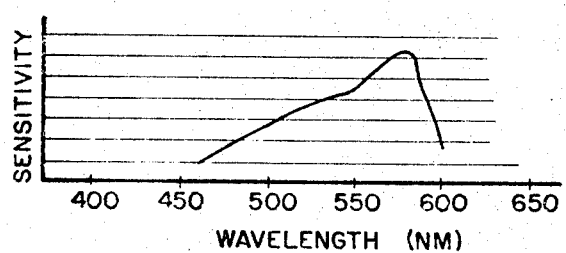
FIG. 6 is a reproduction of the wedge spectrogram of the sensitizing response of the dye material which comprises the energy absorbing and transmitting substance added to the supersensitized material whose wedge spectrogram is reproduced in FIG. 2 to produce the wedge spectrogram reproduced as FIG. 5.

Next, the material which contains the 5-second imbibed concentration of the above-denoted supersensitizing dye mixture was itself imbibed in a $1 \times 10^{-4}$ molar methanol solution of a green absorbing dye corresponding to the formula:

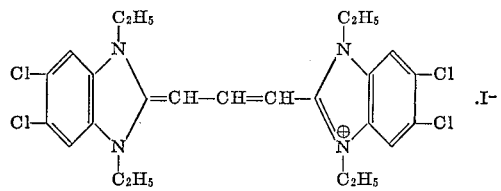

for 15 seconds; was washed twice in methanol and once in acetone and allowed to air dry. The absorption spectrum of this material appears as the broken line in FIG. 1 and its action spectrum is illustrated in FIG. 5. Note particularly the pronounced increase in photographic response in the area between 520 and 580 nm. which is attributable to the presence of the layer of energy absorbing and transmitting material directly superposed on the supersensitizing dye mixture. The sharp peak at 580 nm. corresponds to the action spectrum of the green absorbing dye acting alone, which is illustrated in FIG. 6.

The supersensitizing combination utilized in the instant experiment is such that it evidences no sharp peak maximum sensitization area as a function of dye coverage but exhibits a plateau of maximum sensitization across a wide range of dye coverages. In determining the approximate area of the photosensitive binderless material of the instant experiment, a quantity of radioactive thiosulfate was adsorbed onto the surface thereof and compared with the quantity of radioactive thiosulfate adsorbed by a crystal of given surface area. On this basis it was found that the active surface area of the binderless material is comparable to the active surface area of the crystal. However, the absorption of the spectrally sensitized binderless material is increased over that of a single, perfect crystal covered with a dye layer by the effects of light scattering and internal reflection. Nevertheless, even attributing maximum absorptions to these effects, the absorption of about 15 percent at 620 nm., the photographically active area of the supersensitized material (see FIG. 1) indicates that more than one layer of supersensitized dye is present on the surface of the binderless photosensitive material in view of the hereinbefore denoted fact that a monomolecular layer of dye on a single crystal absorbs about 7 percent of the incident radiation. In addition, it will be recognized that the red-absorbing dye utilized in the supersensitizing mixture comprises a thiazole while the green-absorbing dye comprises an imidazole. As has been stated hereinbefore, a thiazole is far more tenaciously bonded to a silver halide material than an imidazole; and, while the thiazole will displace an imidazole from the surface of a silver halide structure, the converse will not occur. Accordingly, it will be appreciated that the binderless material of the present experiment is completely covered with the above-denoted supersensitizing mixture and the layer of green-absorbing dye is deposited thereover and does not compete with the red-absorbing dye for adsorption sites.

EXAMPLE II

A silver iodochlorobromide emulsion containing 1% iodide and having a very narrow grain size distribution was prepared according to conventional procedures utilizing solutions which comprise:

Solution A:                                              Gms.
  Distilled water _____ 5750
  Potassium chloride _____ 205
  Solution formed by dissolving 800 gms. of gelatin in 8800 ml. of distilled water and adjusting the p to 10; then adding 88 gms. of phthalic anhydride in 616 ml. of acetone and adjusting the pH to 6 _____ 2260

Solution B:
  Distilled water _____ 5336
  Potassium chloride _____ 1026

Solution C:
  Distilled water _____ 5336
  Silver nitrate _____ 2000

Solution D:
  Distilled water _____ 5300
  Potassium bromide _____ 1365
  Potassium iodide _____ 20

Solution E:
  Gelatin _____ 950

Preparation was carried out by a conventional double jet addition of Solutions B and C to Solution A over a period of about 3½ minutes. After a 5 minute digestion period Solution D was added over another 3½ minutes. After a 35 minute digestion period and conventional flocculation and washing, Solution E was added and after-ripening was carried out at 54° C. and a pH of 5.7 for 3½ hours. Using the emulsion prepared according to the above procedure, negatives were fabricated on a clear cellulose triacetate base which, when developed in Dektol Developer (trademark of Eastman Kodak Company for a developer comprising 1500 gms. of water, 30 gms. p-methylaminophenol sulfate, 45 gms. desiccated sodium sulfite, 12 gms. hydroquinone, 80 gms. monohydrated sodium carbonate and 2 gms. potassium bromide) for one minute, forty-five seconds at 70° F., had a $D_{max}$ of 2.36, a $D_{min}$ of 0.03 and an ASA speed of 8.

Next, methanol solutions of red-, green- and blue-absorbing cyanine dyes conforming to the respective formulae:

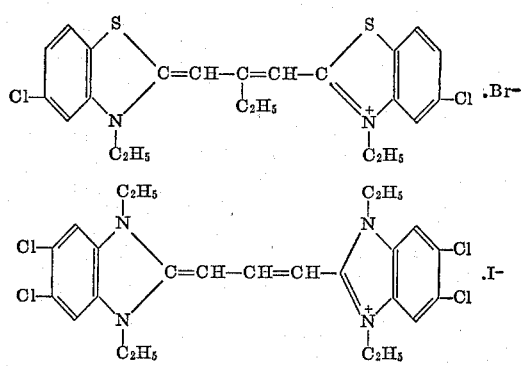

and

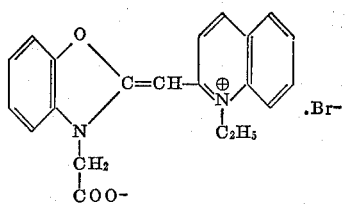

were prepared on a 1 mg. of dye per ml. of methanol basis.

A concentration series of 0.25, 0.50, 0.75, 1.0, 2.0 and 4.0 mgs. of red-absorbing dye per gm. of silver was next run on the above emulsion and it was determined that maximum sensitization of the emulsion with this dye is reached at about 1 mg. of dye per gm. of silver. Maximum spectral response with the red-absorbing dye supersensitized with the blue-absorbing dye was found to occur when the red-absorbing dye was present in a concentration of 0.9 mg. per gm. of silver and a molar equivalent of blue dye, i.e., 0.7 mg. was present in the mixture.

Based on information concerning grain shape and size of the above-prepared emulsion, determined from photomicrographic data, it was computed that monomolecular coverage of the grains with the red-absorbing dye alone would occur at about 1.5 mg. red dye per gm. of silver. Accordingly, it was calculated that a supersensitizing dye solution comprising 1.6 mg. of blue dye supersensitized red dye wherein the dyes are present in equimolar amounts would provide 1.09 monomolecular layers of dye coverage on the grain surfaces at a point within the maximum sensitization range of the supersensitized emulsion.

Aliquots of the above-prepared emulsion containing 1 gm. of silver were measured out and melted down at 38° C. To one such aliquot was added a premixed, methanol solution containing 0.9 mg. of the above-described red dye and 0.7 mg. of the above-described blue supersensitizer with a small quantity of a wetting agent. Aerosol OT. This mixture was stirred for 20 minutes at 38° C.

A second aliquot was melted down and sensitized with the same amounts of components as described in the paragraph next above. After stirring, however, 1.63 mg. of the above-described green dye and an additional small quantity of Aerosol OT was added. This amount of green dye in the particular emulsion utilized was calculated to produce approximately 0.9 monomolecular layer. The mixture was again stirred at 38° C. for 20 minutes.

Samples of each of the two sensitized emulsions were coated onto cellulose triacetate base material. After drying, absorption spectra and wedge spectrograms were obtained. The absorption spectrum of the supersensitized emulsion appears as a continuous line in FIG. 7 and the absorption spectrum of the supersensitized emulsion which includes the layer of the green dye appears as the broken line of FIG. 8. The wedge spectrogram of the supersensitized emulsion appears in FIG. 8 and the wedge spectrogram of the supersensitized emulsion which additionally contains a layer of green dye appears in FIG. 9. Again the statement made hereinbefore concerning the improbability of the imidazole compound replacing either the oxazole or thiazole compound at the crystal surface is equally applicable.

Figure 8:
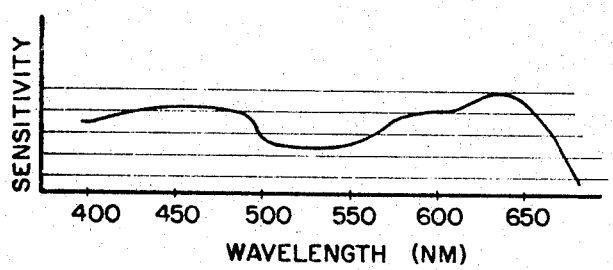
FIG. 8 is a reproduction of the wedge spectrogram produced by the supersensitized silver halide emulsion of FIG. 7.
Figure 9:
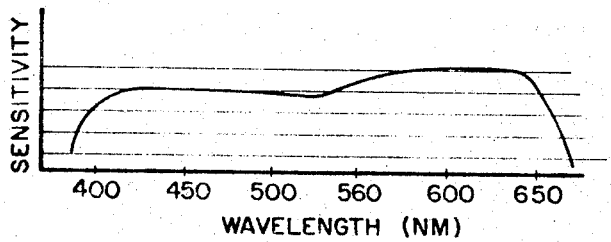
FIG. 9 is a reproduction of the wedge spectrogram produced by the supersensitized silver halide emulsion of FIG. 7 which contains the additional layer of an energy absorbing and transmitting substance.

A comparison of the wedge spectrograms of FIGS. 8 and 9 commands the categorical conclusion that the depicted increase in sensitivity must be attributed to the presence of the layer of green dye superposed on the supersensitized photosensitive grains which comprise the emulsion. Reference to the absorption spectra demonstrates, for example, that at about 500 nm. approximately twice the absorption is noted in the system containing the green dye as in the merely supersensitized system and the wedge spectrograms indeed show about one stop more speed at 500 nm. in the system containing the green dye. Approximately the same relationship also exists at 580 nm.—the major action area of the green dye (see FIG. 6). Categorically then, by means of the instant invention, increased sensitivity has been imparted to a photoresponsive system by a technique which is not only not suggested by the state of the art, but which is effectively contraindicated thereby (see U.S. Pat. No. 2,688,545).

As an illustration of the instant invention utilizing three direct dye layers for the production of a photographic film element employing a photoresponsive gelatino silver halide emulsion comprising spectrally sensitized photoresponsive silver halide crystals, as specifically detailed immediately above, the silver halide crystals may be prepared by reacting a water-soluble silver salt, such as silver nitrate, with at least one water soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or, alternatively, employing any of the various flocculation systems, or procedures, adapted to effect removal of undesired components, for example, the procedures described in U.S. Pats. Nos. 2,614,928; 2,614,929; 2,728,662; and the like; after-ripening the dispersion at an elevated temperature in combination with the addition of gelatin and various adjuncts, for example, the previously detailed chemical sensitizing agents and the like; all according to the traditional procedures of the art, as described in Neblette, C. B., Photography, Its Materials and Processes, 6th ed., 1962.

Optical sensitization of the emulsion's silver halide crystals may then be accomplished by the sequential contact of the emulsion composition with an effective concentration of the following dyes;

(1)

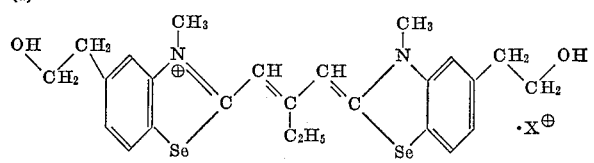

(2)

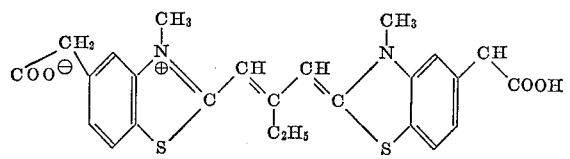

(3)

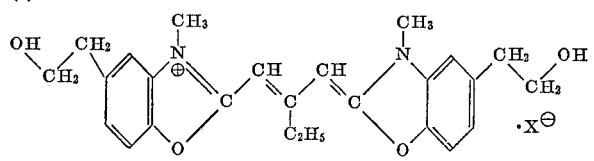

wherein X is an anion, conventionally employed in the cyanine dye art and preferably a relatively small compact anion; and each of which dyes has been dissolved in an appropriate dispersing solvent such as methanol, ethanol, acetone, water, and the like.

The peak absorption wavelengths of the dyes denoted as (1), (2), and (3) occur at about 574 nm., 562 nm. and 487 nm., respectively, as calculated in accordance with the method of John R. Platt, Journal of Chemical Physics, vol. 25, page 80 (1956), and possess band widths wherein the absorption frequency of the thiazole material falls within the transmission frequency range of the oxazole material and the selenazole material possesses an absorption frequency range with the transmission frequency range of the thiazole material thereby establishing an energy circuit from the outermost component toward the photoresponsive material.

Subsequent to spectral sensitization, any further desired additives, such as coating aids and the like, may be incorporated in the emulsion and the mixture coated and processed according to the conventional procedures known in the photographic emulsion manufacturing art.

Alternatively, an emulsion coating can be prepared and coated on a suitable support whereupon the coating may be sequentially immersed in the respective solutions of cyanine dyes.

In view of the foregoing exemplary material it will be appreciated that by means of the present invention an energy circuit has been established which channels photon excitation derived energy into a photoresponsive material by a radiationless transfer between respective layers which comprise from the photoresponsive element materials possessing electromagnetic radiation absorption frequency ranges in increasing order wherein the transmission ranges of each succeeding material overlaps the absorption range of the next preceding material.

Within the context of the present invention it is necessary, in order to achieve optimum results, that the spectral sensitizing dye directly adsorbed onto the photoresponsive material be present at a coverage which will produce sensitization at, or approaching, maximum for that dye or dye system and the particular photoresponsive material. This area is usually reached, as aforementioned at about or slightly less than monomolecular layer coverage. Subsequent layers or dye materials, chosen as indicated hereinbefore by, for example, wedge spectrographic means, while providing the most efficient energy circuit when present as monomolecular layers may be present as multimolecular layers, the internal quantum loss per multimolecular layer being relatively small. Critical, therefore, to the present invention is the relative relationship between the optical sensitizing dye directly adsorbed onto the surface of the photosensitive material and the subsequent layers and further the relationship between the subsequent layers one to the other in that each succeeding layer of material from the surface of the photoresponsive element possess absorption ranges in increasing order and transmission ranges within the absorption range of the next preceding layer of material. Ultimately then, it is evident that by continuing to add energy absorptive material to a spectrally sensitized photoresponsive element instead of achieving the art dictated loss in sensitivity or stagnation at a given sensitivity plateau, by the present invention an increase in sensitivity has been achieved with little, or substantially no degradation in the quantum efficiency of the system.

As has been emphasized hereinabove, while it is preferred that the materials comprising the layers in the energy transmission circuit of the present invention subsequent to the initially adsorbed layer comprise spectral sensitizing dyes, it is not critical that they be so constituted. For example, any one of the layers superposed over the initially adsorbed spectral sensitizing dye layer may comprise an inorganic material provided that the herein-recited frequency absorption and transmission parametric considerations concerning the respective layers of the system are satisfied. Inorganic constituents of the circuits of the present invention may be integrated into the systems by well-known adsorption techniques in order to provide the requisite thin layer. To insure uniformity of deposition, it is preferred in the case of many inorganic photoconductor materials to deposit them by evaporation techniques.

Among the many systems which might be fabricated utilizing inorganic constituents in a total spectral sensitization circuit would be, for example, phosphorous-doped gallium arsenide deposited over a near infrared sensitizing dye which is directly adsorbed onto a surface of a silver bromide crystal. In this embodiment, as with certain others which have been heretofore described, it is preferable to utilize a spacer layer which may comprise, for example, barium stearate in order to insure that no reaction products are formed between the silver halide and gallium arsenide which might deleteriously effect the performance of the desired circuitry. While the gallium arsenide might be used without phosphorous doping, it will be appreciated by those having skill in this art that the degree of phosphorous doping will determine the frequency emission range of the gallium arsenide. Accordingly, depending upon the particular dye that one desires to utilize with the gallium arsenide, one may tailor its response by carefully controlling the degree of phosphorous doping employed.

A typical spectral sensitizing dye which may be adsorbed to the surface of a silver bromide crystal for utilization in conjunction with phosphorous-doped gallium arsenide is

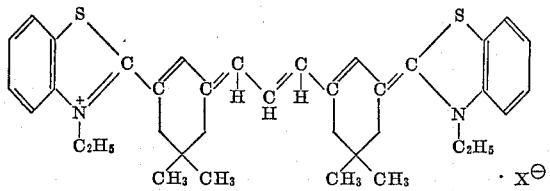

which is capable of absorbing electromagnetic radiation energy of a frequency of approximately 8600 A. Superposed thereover might be a layer of barium stearate having a thickness of approximately 50 A. and over the barium stearate might be superposed a layer of phosphorous-doped gallium arsenide which emits electromagnetic radiation energy of a frequency of approximately 8600 A.

Other inorganic materials which may be utilized in the context of the present invention to provide the described circuitry are cadmium sulfide, which may be used, for example, in conjunction with Rose Bengal or Neosyn Y sensitizing dyes on a zinc oxide crystal; pure silicon, which may be used with a far infrared spectral sensitizing dye adsorbed to the surface of a silver bromide or zinc oxide crystal, preferably in the presence of a suitable fatty acid spacer layer; etc.

In determining the suitability of various inorganic materials for utilization in the environment of the present invention, the electromagnetic energy absorption and transmission characteristic thereof may be determined by conventional means. Preferably, the inorganic materials will be such that they will exhibit rapid emission on electrical stimulation when utilized in a composite junction diode laser environment.

As previously detailed, the photoresponsive crystals of the present invention may be employed as the photosensitive component of a photographic emulsion by incorporation within a suitable binder and the coating and processing of the thus prepared emulsion according to conventional procedures known in the photographic film manufacturing art.

The photoresponsive crystal material of the photographic emulsion will, as previously described, preferably comprise a crystal of a silver compound, for example, one or more of the silver halides such as silver chloride, silver iodide, silver bromide, or mixed silver halides such as silver chlorobromide or silver iodobromide, of varying halide ratios and varying silver concentrations. The formulated photographic emulsions may be used for the preparation of orthochromatic, panchromatic, and infrared sensitive photographic films.

The fabricated emulsion may be coated onto various types of rigid or flexible supports, for example, glass, paper, metal, polymeric films of both the synthetic types and those derived from naturally occurring products, etc. Especially suitable materials include paper; aluminum; polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetate-butyrate, or acetate-propionate; polycarbonates; polystyrenes, etc.

The emulsions may include the various adjuncts, or addenda, according to the techniques disclosed in the art, such as speed increasing compounds of the quaternary ammonium type, as described in U.S. Pats. Nos. 2,271,623; 2,288,226; and 2,334,864; or of the polyethyleneglycol type, as described in U.S. Pat. No. 2,708,162; or of the preceding combination, as described in U.S. Pat. No. 2,886,437; or the thiopolymers, as described in U.S. Pats. Nos. 3,046,129 and 3,046,134.

The emulsions may also be stabilized with the salts of the noble metals such as ruthenium, rhodium, palladium, iridium and platinum, as described in U.S. Pats. Nos. 2,566,245 and 2,566,263; the mercury compounds of U.S. Pats. Nos. 2,728,663; 2,728,664 and 2,728,665; triazoles of U.S. Pat. No. 2,444,608; the aziindines of U.S. Pats. Nos. 2,444,605; 2,444,606; 2,444,607; 2,450,297; 2,444,609; 2,713,541; 2,743,181; 2,716,062; 2,735,769; 2,756,147; 2,772,164; and those disclosed by Burr in "Wiss. Phot.," volume 47, 1952, pages 2–28; the disulfides of Belgian Pat. No. 569,317; the benzothiazolium compounds of U.S. Pats. Nos. 2,131,038 and 2,694,716; the zinc and cadmium salts of U.S. Pat. No. 2,839,405; and the mercapto compounds of U.S. Pat. No. 2,819,965.

Hardening agents such as inorganic agents providing polyvalent metallic atoms, specifically polyvalent aluminum or chromium ions, for example, potash alum $$[K_2Al_2(SO_4)_4 \cdot 24H_2O]$$

and chrome alum $$[K_2CR_2(SO_4)_4 \cdot 24H_2O]$$

and inorganic agents of the aldehyde type, such as formaldehyde, glyoxal, mucochloric acid, etc.; the ketone type such as diacetyl; the quinone type; and the specific agents described in U.S. Pats. Nos. 2,080,019; 2,725,294; 2,725,-295; 2,725,305; 2,726,162; 2,732,316, 2,950,197; and 2,870,013, may be incorporated in the emulsion.

The emulsion may also contain one or more coating aids such as saponin; a polyethyleneglycol of U.S. Pat. No. 2,831,766; a polyethyleneglycol ether of U.S. Pat. No. 2,719,087; a taurine of U.S. Pat. No. 2,739,891; a maleopimarate of U.S. Pat. No. 2,823,123; an amino acid of U.S. Pat. No. 3,038,804; a sulfosuccinamate of U.S. Pat. No. 2,992,108; or a polyether of U.S. Pat. No. 2,600,-831; or a gelatin plasticizer such as glycerin; a dihydroxyalkane of U.S. Pat. No. 2,960,404; a bisglycolic acid ester of U.S. Pat. No. 2,904,434; a succinate of U.S. Pat No. 2,940,854; or a polymeric hydrosol of U.S. Pat. No. 2,852,386.

As the binder for photosensitive crystals, the aforementioned gelatin may be, in whole or in part, replaced with some other colloidal material such as albumin, casein; or zein; or resins such as a cellulose derivative, as described in U.S. Pats. Nos. 2,322,085 and 2,327,808; polyacrylamides, as described in U.S. Pat. No. 2,541,474; vinyl polymers such as described in U.S. Pats. Nos. 2,253,078; 2,276,322; 2,276,323; 2,281,703; 2,310,223; 2,311,085; 2,311,059; 2,414,208; 2,461,023; 2,484,456; 2,538,257; 2,579,016; 2,614,931; 2,624,674; 2,632,704; 2,642,420; 2,678,884; 2,691,582; 2,725,296; 2,753,264; and the like.

The photographic emulsions may be employed in black-and-white or color photographic systems, of both the additive and subtractive types, for example, those described in Photography, Its Materials and Processes, supra. The photoresponsive crystals may also be employed in the fabrication of photographic emulsions which form latent images predominantly on the surface of the crystal or in emulsions which form latent images predominantly inside the crystal such as those described in U.S. Pat. No. 2,592,250.

The fabricated emulsions may also be employed in silver diffusion transfer processes of the types set forth in U.S. Pats. Nos. 2,352,014; 2,500,421; 2,543,181; 2,563,342; 2,565,376; 2,584,029; 2,584,030; 2,603,565; 2,616,807; 2,635,048; 2,644,756; 2,647,055; 2,662,822; 2,698,236; 2,698,237; 2,698,238; 2,698,245; 2,702,244; 2,704,721; 2,740,715; 2,759,825; 2,774,667; 2,823,122; 2,923,623; 2,938,792; 2,962,377; 2,984,565; 3,003,875; 3,043,690; 3,087,815; 3,087,816; 3,091,530; 3,108,001 and 3,113,866; in additive color diffusion transfer processes of the types disclosed in U.S. Pats. Nos. 2,614,926; 2,726,154; 2,944,894; 2,992,103 and 3,087,815; and in subtractive color diffusion transfer processes of the types disclosed in U.S. Pats. Nos. 2,559,643; 2,600,996; 2,614,-

925; 2,647,049; 2,661,293; 2,698,244; 2,698,798; 2,774,668; 2,802,735; 2,855,299; 2,892,710; 2,909,430; 2,968,554; 2,983,605; 2,983,606; 2,992,104; 2,992,105; 2,992,106, 2,997,390; 3,003,872, 3,015,501; 3,019,104; 3,019,124; 3,022,166; 3,022,167; 3,039,869; 3,043,689; 3,043,692; 3,444,873; 3,047,386; 3,065,074; 3,069,262; 3,069,263; 3,069,264; 3,076,808; 3,076,820; 3,077,400 and 3,077,402.

The photoresponsive crystals of the present invention may also be employed as the photosensitive component of information recording elements which employ the distribution of a dispersion of relatively discrete photoresponsive crystals, substantially free from intersitial binding agents, on a supporting member such as those previously designated, to provide image recording elements, for example, as described in U.S. Pats. Nos. 2,945,771; 3,142,566; 3,142,567; Newman, Comment on Non-Gelatin Film, B.J.O.P., 534, Sept. 15, 1961; and Belgian Pats. Nos. 642,557 and 642,558.

As taught in the art, the concentration of silver halide crystals forming the photographic emulsion and the relative structural parameters of the emulsion layer, for example, the relative thickness, and the like, may be varied extensively and drastically, depending upon the specific photographic system desired and the ultimate employment of the selective photographic system.

In conventional photographic processes, for the formation of silver images, a latent image is provided by selective exposure of a photosensitive photographic emulsion, generaly containing the aforementioned photoresponsive silver halide crystals or the like. The thus-produced latent image is developed, to provide a visible silver image, by a suitable contact with any of the photographic developing solutions set forth in the art. For the purpose of enhancing the resultant visible image's stability, the image may be suitably fixed, according to the procedures also well known to those skilled in the art. The resultant image-containing element may be then directly employed or, optionally, may be employed, where applicable, as a negative image, for example, to provide a reversed or positive image by conventional contact or projection printing processes employing suitable photosensitive printing papers.

In the conventional photographic subtractive color processes which find extensive commercial ultilization, color coupling techniques are generally employed to provide the requisite number of registered color images necessary for monochromatic and multichromatic reproduction. According to these techniques, one or more selectively photoresponsive, generally gelatinous, silver halide strata are selectively exposed to provide latent image record formation corresponding to the cromaticity of the selected subject matter. The resultant latent images are suitably developed by selective intimate contact between one or more color developing agents and one or more color formers or couplers to provide the requisite negative color images. Alternatively, the latent images are developed to provide visible silver images; the resultant visible images removed; the remaining residual silver halide exposed, and the second-formed exposure records developed by selective contact between one or more color developing agents and one or more color formers or couplers, in the presence of exposed silver halide to provide the desired colored positive image.

In diffusion transfer processes, for the formation of positive silver images, a latent image contained in an exposed, photosensitive, generally gelatinous, silver halide emulsion is developed and, substantially contemporaneous with development, a soluble silver complex is obtained by reaction of a silver halide solvent with the unexposed and undeveloped silver halide of the emulsion. The resultant soluble silver complex is, at least in part, transported in the direction of a suitable print-receiving element, and the silver of the complex precipitated in such element to provide the requisite positive image definition.

Additive color reproduction may be produced by exposing a photosensitive silver halide emulsion through an additive color screen having filter media or screen elements, each of an individual additive color such as red, blue or green, and by viewing the resultant image, subsequent to development, through the same or a similar screen element. Alternatively, the photosensitive element may be employed to provide a silver transfer image analogous to the preceding description of diffusion transfer processing and the resultant transfer image may be viewed through the same, or a similar, additive color screen which is suitably registered with the silver transfer image carried by the print-receiving image.

Substractive color reproduction may be provided by diffusion transfer techniques wherein one or more photoresponsive spectrally selective silver halide elements, having an appropriate substractive color-providing material associated therewith, are selectively exposed to provide the requisite latent image record formations corresponding to the chromaticity of the selected subject matter and wherein the distribution of color-providing materials, by diffusion, to a suitable image-receiving element, is controlled, imagewise, as a function of the respective latent image record formations.

The photoresponsive crystals of the present invention may also be employed as the photoconductive component of electrophotographic materials, for example, inorganic photoconductive crystals such as zinc oxide, selenium, cadmium sulfide, cadmium telluride, indium axide, antimony trisulfide, and the like, and organic photoconductive crystals such as anthracene, sulfur, benzidine, the aromatic furanes of U.S. Pat. No. 3,140,946, and the like, as described in U.S. Pats. Nos. 2,987,395; 2,047,384; 3,052,540; 3,069,365; 3,110,591; 3,121,008; 3,125,447 and 3,128,179.

In preparing photoconductive layers, it is the usual practice to suspend the photoconductive crystal in a suitable solvent in the presence of an electrically insulating binder and then to dissolve the optical sensitizing dye in this composition prior to coating on a conducting support. Where the layers are thus prepared, the optical sensitizing components are added to the coating composition, prior to coating, in the manner of the instant invention as described hereinbefore.

Alternatively, an unsensitized photoconductive layer can be prepared and the coating then sensitized according to the previously described alternate procedure.

Preferred binders for use in preparing the photoconductive layers comprise polymers having fairly high dielectric strength and which are good electrically insulating film-forming vehicles. Materials of this type comprise styrene-butadiene copolymers; silicone resins; styrene-alkyd resins; soya-alkyd resins; poly(vinyl chloride); poly(vinylidene chloride); vinylidene chloride, acrylonitrile copolymers; poly(vinyl acetate); vinyl acetate, vinyl chloride copolymers; poly(vinyl acetals), such as poly(vinyl butyral); polyacrylic and methacrylic esters, such as poly(methyl methacrylate), poly(n-butyl methacrylate) poly(isobutyl methacrylate), etc.; polystyrene; nitrated polystyrene; polymethylstyrene; isobutylene polymers; polyesters, such as poly(ethylene-alkaryloxy-alkylene terephthalate); phenol-formaldehyde resins; ketone resins; polyamides; polycarbonates, etc. Methods of making resins of this type have been described in the prior art, for example, styrene-alkyd resins can be prepared according to the method described in U.S. Pats. Nos. 2,361,019 and 2,258,423. Other types of binders which can be used in the photoconductive layers include such materials as paraffin, mineral waxes, and the like.

Solvents of choice for preparing the last-mentioned coating compositions can include a number of solvents such as benzene, toluene, acetone, 2-butanone, chlorinated hydrocarbons, e.g., methylene chloride, ethylene chloride, etc., ethers, e.g., tetrahydrofuran, or mixtures of these solvents, etc.

The photoconductive layers can then be coated on a conducting support in any well-known manner such as the conventional doctor-blade coating, swirling, dip-coating, and the like, techniques. Although photoconductive layers in some cases do not require a binder, it is usually beneficial to include some binder in a coating composition of this type, for example, as little as 1 weight percent.

In preparing the coating composition, useful results will be obtained where the photoconductor substance is present in an amount equal to at least about 1 weight percent of the coating composition. The upper limit in the amount of photoconductor substance present is not critical. As indicated previously, the polymeric materials in many cases do not require a binder in order to obtain a self-supporting coating on the support. In those cases where a binder is employed, it is normally desired that the photoconductive substance be present in an amount from about 1 weight percent of the coating composition to about 99 weight percent of the coating composition. A preferred weight range for the photoconductor substance in the coating composition is from 10 weight percent to about 60 weight percent.

Coating thicknesses of the photoconductive composition or a support can vary widely. Normally a wet coating in the range from about 0.001 inch to about 0.01 inch is useful. A preferred range of wet coating thickness may be found to be in the range from about 0.002 inch to about 0.006 inch.

Suitable supporting materials for the photoconductive layers of the present invention can include any of the electrically conducting supports, for example, paper (at a relative humidity above 20 percent); aluminum-paper laminates; metal foils, such as aluminum foil, zinc foil, etc.; metal plates, such as aluminum, copper, zinc, brass, and galvanized plates, regenerated cellulose and cellulose derivatives; certain polyesters and especially those having a thin electroconductive layer (e.g., cuprous iodide) coated thereon; and the like.

The photoconductive elements can be employed in any of the well-known electrophotographic processes which require photoconductive layers. One such process is the xerographic process. In a process of this type, the electrophotographic element is given a blanket electrostatic charge by placing the same under a corona discharge which serves to give a uniform charge to the surface of the photoconductive layer. This charge is retained by the layer owing to the substantial insulating property of the layer, i.e., the low conductivity of the layer in the dark. The electrostatic charge formed on the surface of the photoconducting layer is then selectively dissipated from the surface of the layer by exposure to light through a negative by a conventional exposure operation such as, for example, by a contact-printing technique, or by lens projection of an image, etc., to form a latent image in the photoconductive layer. By exposure of the surface in this manner, a charged pattern is created by virtue of the fact that light causes the charge to leak away in proportion to the intensity of the illumination in a particular area. The charge pattern remaining after exposure is then developed, i.e., rendered visible, by treatment with a medium comprising electrostatically attractable particles having optical density. The developing electrostatically attractable particles can be in the form of a dust, i.e., powder, a pigment in a resinous carrier, i.e., toner, or a liquid developer may be used in which the developing particles are carried in an electrically insulating liquid carrier. Methods of development of this type are widely known and have been described in the patent literature in such patents, for example, as U.S. Pat. 2,296,691, and the like. In process of electrophotographic reproduction such as in xerography, by selecting a developing particle which has as one of its components, a low-melting resin, it is possible to treat the developed photoconductive material with heat and cause the powder to adhere permanently to the surface of the photoconductive layer. In other cases, a transfer of the image formed on the photoconductive layer can be made to a second support which would then become the final print. Techniques of the type indicated are well known in the art and have been described in U.S. Pats. Nos. 2,297,691 and 2,551,582 and in "RCA Review," vol. 15 (1954), pages 469–484.

Throughout the specification the term "photo-excitation-derived energy" is utilized. In the context of the present invention, that term describes the stimulus, induced by incident electromagnetic radiation, which is capable of producing photochemical changes in a photosensitive material.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A spectrally sensitized photoresponsive composite article comprising a photoresponsive element selected from the group consisting of photoconductors and photosensitive silver halides having a spectral sensitization system adsorbed to a surface thereof, said system comprising, in order from the element surface, a directly adsorbed layer comprising at least one cyanine spectral sensitizing dye, said directly adsorbed layer being no more than approximately monomolecular thickness, and superposed thereover at least one layer of an inorganic energy absorbing and transmitting photoresponsive material, said spectral sensitizing dye and said material being capable of absorbing incident electromagnetic radiation energy and photon-excitation-derived energy transmitted from at least any next succeeding layer of energy absorbing and transmitting material within a given frequency range and transmitting said energy within a lower frequency range, wherein said adsorbed spectral sensitizing dye layer and each superposed layer of energy absorbing and transmitting material possesses an intrinsic energy absorption frequency range in increasing order outward from the photoresponsive element surface and each superposed layer of energy absorbing and transmitting material possesses an intrinsic energy transmission frequency range which overlaps the energy absorption frequency range of the next preceding layer thereby establishing a circuit capable of transmitting photon-excitation-derived energy to said photoresponsive element.

2. The invention of claim 1 wherein the amount of directly adsorbed cyanine spectral sensitizing dye is such that the sensitivity of the photoresponsive element is maximized prior to the addition of the superposed energy absorbing and transmitting material.

3. The invention of claim 2 wherein the directly adsorbed cyanine spectral sensitizing dye layer comprises a supersensitized cyanine spectral sensitizing dye.

4. The invention of claim 3 wherein the directly adsorbed cyanine spectral sensitizing dye layer and each superposed layer of energy absorbing and transmitting material is present in a substantially monomolecular layer.

5. The invention of claim 4 wherein at least one monomolecular layer is separated from the next adjacent monomolecular layer by an insulating material less than 200 A. in thickness.

6. The invention of claim 1 wherein said photoresponsive element comprises a silver halide crystal.

7. The invention of claim 1 wherein said photoresponsiveness element comprises a photoconductive zinc oxide crystal.

8. A photoresponsive product which comprises a plurality of spectrally sensitized photoresponsive composite articles distributed on the surface of a support, said articles comprising photoresponsive elements selected from the group consisting of photoconductors and photosensitive silver halides having a spectral sensitization system adsorbed to surfaces thereof, said system comprising, in order, from the elements surfaces, a directly adsorbed layer comprising at least one cyanine spectral sensitizing dye, said directly adsorbed layer being no more than approximately monomolecular thickness, and superposed thereover at least one layer of an inorganic energy absorbing and transmitting photoresponsive material, said spectral sensitizing dye and said material being capable of absorbing incident electromagnetic radiation energy and photon-excitation-derived energy transmitted from at least a next succeeding layer of energy absorbing and transmitting material within a given frequency range and transmitting said energy within a lower frequency range, wherein said directly adsorbed spectral sensitizing dye layer and each superposed layer of energy absorbing and transmitting material possesses an intrinsic energy absorption frequency range in increasing order outward from the photoresponsive elements surfaces and each superposed layer of energy absorbing and transmitting material possesses an intrinsic energy transmission frequency range which overlaps the energy absorption frequency range of the next preceding layer thereby establishing a circuit capable of transmitting photon-excitation-derived energy to said photoresponsive elements.

9. The invention of claim 8 wherein said plurality of photoresponsive articles is dispersed in a polymeric binder.

10. The invention of claim 9 wherein said photoresponsive elements comprise silver halide crystals.

11. The invention of claim 10 wherein said polymeric binder comprises gelatin.

12. The invention of claim 11 wherein said photoresponsive elements comprise photoconductive zinc oxide crystals.

13. The invention of claim 11 wherein said polymeric binder comprises an electrically insulating material.

14. The invention of claim 13 wherein said support comprises an electrically conducting support.

15. The invention of claim 13 including an electrically conducting layer intermediate said support and said photoresponsive article-containing layer.

References Cited
UNITED STATES PATENTS

| | | | |
|---|---|---|---|
| 3,623,881 | 11/1971 | Fumia | 96—127 |
| 2,221,805 | 11/1940 | Leermakers | 96—125 |
| 2,816,029 | 12/1957 | Jones | 96—104 |

CHARLES E. VAN HORN, Primary Examiner

U.S. Cl. X.R.

96—1.6, 122, 124, 126, 130, 132, 137, 140